US012784057B2

(12) United States Patent
Li et al.

(10) Patent No.: US 12,784,057 B2
(45) Date of Patent: Nov. 3, 2026

(54) SYSTEM AND METHODS OF VERIFIABLE SMART CONTRACT AS A SERVICE

(71) Applicant: HUAWEI TECHNOLOGIES CO., LTD., Shenzhen (CN)

(72) Inventors: Jian Li, Addison, TX (US); Han Su, Addison, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 33 days.

(21) Appl. No.: 18/583,447

(22) Filed: Feb. 21, 2024

(65) Prior Publication Data

US 2024/0193611 A1 Jun. 13, 2024

Related U.S. Application Data

(63) Continuation of application No. PCT/US2021/050204, filed on Sep. 14, 2021.

(51) Int. Cl.
*G06Q 20/40* (2012.01)
*G06Q 20/02* (2012.01)
*G06Q 20/38* (2012.01)

(52) U.S. Cl.
CPC ........... *G06Q 20/407* (2013.01); *G06Q 20/02* (2013.01); *G06Q 20/3827* (2013.01)

(58) Field of Classification Search
CPC .. G06Q 20/407; G06Q 20/02; G06Q 20/3827; H04L 9/3236; H04L 9/50
See application file for complete search history.

(56) References Cited

U.S. PATENT DOCUMENTS 11,157,484 B2 * 10/2021 Padmanabhan ......... G06F 16/27
12,212,686 B2 * 1/2025 Chu ...................... H04L 9/3247
2017/0265238 A1 * 9/2017 Li ......................... H04W 48/16
2017/0352027 A1 12/2017 Zhang
2019/0305958 A1 10/2019 Qiu
2020/0177388 A1 6/2020 Qiu
2020/0280444 A1 * 9/2020 Tang ..................... H04L 9/3247
2023/0073337 A1 * 3/2023 Chan .................... G06Q 20/405

OTHER PUBLICATIONS

Herlihy et al., Atomic Cross-Chain Swaps, May 18, 2018; arXiv; https://arxiv.org/pdf/1801.09515 (Year: 2018).*

(Continued)

*Primary Examiner* — Yingying Zhou
(74) *Attorney, Agent, or Firm* — Conley Rose, P.C.

(57) ABSTRACT

An electronic device includes a memory; and a processor coupled to the memory and configured to receive instructions from the memory which, when executed by the processor, cause the electronic device to transmit first data associated with a first blockchain to a second application; receive second data associated with a second blockchain from the second application; transmit the first data to a middleware smart contract; perform a first blockchain function using the first data and the second data to obtain a first result; receive third data from the middleware smart contract in response to transmission of the first data to the middleware smart contract; trust the middleware smart contract when the first result and third data match; and generate an alert when the first result and the third data do not match.

21 Claims, 5 Drawing Sheets

(56) References Cited

OTHER PUBLICATIONS

Amritraj Singh, et al. Sidechain technologies in blockchain networks: An examination and state-of-the-art review. Journal of Network and Computer Applications, vol. 149, Jan. 1, 2020. (Abstract only).
Digital Asset. 2020. Canton : A Private , Scalable, and Composable Smart Contract Platform. (2020), pp. 1-15.
Rafael Belchior, et al., "A Survey on Blockchain Interoperability: Past, Present, and Future Trends,", https://arxiv.org/abs/2005.14282v3 (cs.DC] Mar. 22, 2021, pp. 1-63.

* cited by examiner

SYSTEM AND METHODS OF VERIFIABLE SMART CONTRACT AS A SERVICE

CROSS-REFERENCE TO RELATED APPLICATIONS

This application is a continuation of International Application No. PCT/US2021/050204 filed on Sep. 14, 2021, which is hereby incorporated by reference.

TECHNICAL FIELD

This disclosure is related to the technical field of blockchain transactions, in particular trusted cross-chain interoperability.

BACKGROUND

A blockchain is a type of distributed electronic ledger. Various software applications may access a blockchain to record data and conduct transactions. Blockchains include a series of data blocks. Each data block depends upon a previous data block. The data blocks can include records of transactions or other data, timestamps, and data based on the previous data block, for example a hash of the previous data block. Because each data block depends on the previous block, tampering with data in a block is unlikely because every previous block would have to be altered. Various entities have their own blockchains. When a first entity associated with a first blockchain desires a transaction with a second entity associated with a second blockchain, a crosschain transaction occurs. For example, a first manufacturer maintains a blockchain-based network that comes with a television, while a smartphone has its own company initiated blockchain-based network. When a consumer has both the TV and the smartphone, the consumer may want to use the smartphone to control the TV or use the TV to push certain streaming program to the smartphone, hence transactions happen between the corresponding blockchains arise.

Blockchain transactions can be facilitated by a smart contract. A smart contract is a contract or operation executed when certain conditions are met. The conditions for executing a smart contract can be based on data stored in the blockchain. While a single blockchain is very secure, transactions between block chains introduce risk of tampering or other security risks.

SUMMARY

A first aspect relates to an electronic device comprising a memory; and a processor coupled to the memory and configured to receive instructions from the memory which, when executed by the processor, cause the electronic device to transmit first data associated with a first blockchain to a second application; receive second data associated with a second blockchain from the second application; transmit the first data to a middleware smart contract; perform a first blockchain function using the first data and the second data to obtain a first result; receive third data from the middleware smart contract in response to transmission of the first data to the middleware smart contract; trust the middleware smart contract when the first result and third data match; and generate an alert when the first result and the third data do not match.

By performing a handshake transaction between two applications and a separate transaction with the middleware smart contract, a trust is achieved with the middleware smart contract.

In a first implementation form of the electronic device according to the first aspect as such, the first blockchain is associated with a first owner and a first application.

In a second implementation form of the electronic device according to the first aspect as such, the second blockchain is associated with a second owner and the second application.

In a third implementation form of the electronic device according to the first aspect as such, the middleware smart contract is associated with a third blockchain, wherein the third blockchain is a consortium blockchain associated with the first owner and the second owner.

In a fourth implementation form of the electronic device according to the first aspect as such, subsequent to trusting the middleware smart contract, the instructions further cause the electronic device to transmit fourth data associated with the first blockchain; receive fifth data associated with the second blockchain; perform the first blockchain function using the fourth data and the fifth data to obtain a second result; transmit, after a delay, the fourth data to the middleware smart contract; receive sixth data from the middleware smart contract in response to transmission of the fourth data to the middleware smart contract; trust the middleware smart contract when the second result and sixth data match; and generate an alert when the second result and the third data do not match.

In a fifth implementation form of the electronic device according to the first aspect as such, subsequent to trusting the middleware smart contract, the instructions further cause the electronic device to transmit, via a first communication medium, fourth data associated with the first blockchain; receive, via the first communication medium, fifth data associated with the second blockchain; perform the first blockchain function using the fourth data and the fifth data to obtain a second result; transmit, via a second communication medium, the fourth data to the middleware smart contract; receive, via the second communication medium, sixth data from the middleware smart contract in response to the fourth data; trust the middleware smart contract when the second result and sixth data match; and generate an alert when the second result and the third data do not match.

In a sixth implementation form of the electronic device according to the first aspect as such, subsequent to trusting the middleware smart contract, the instructions further cause the electronic device to transmit fourth data associated with the first blockchain to the second application; receive fifth data associated with the second blockchain from the second application; transmit the fourth data to the middleware smart contract; perform the first blockchain function using the fourth data and the fifth data to obtain a second result; receive sixth data from the middleware smart contract in response to transmission of the first data to the middleware smart contract; trust the middleware smart contract when the second result and third data match; and generate an alert when the second result and the sixth data do not match.

In a seventh implementation form of the electronic device according to the first aspect as such, subsequent to trusting the middleware smart contract, the instructions further cause the electronic device to perform a second blockchain function using the first result and the second result to obtain a third result; receive seventh data from the middleware smart contract; trust the middleware smart contract when the third result and the seventh data match; and generate an alert when the third result and the seventh data do not match.

In an eighth implementation form of the electronic device according to the first aspect as such, when the middleware smart contract is trusted, the instructions further cause the electronic device to transmit real-world data to the middleware smart contract; and receive a real-world result from the middleware smart contract.

In a ninth implementation form of the electronic device according to the first aspect as such, the first data is transmitted to the second application using a first transmission medium, and wherein the first data is transmitted to the middleware smart contract using a second transmission medium.

In a tenth implementation form of the electronic device according to the first aspect as such, the first data is transmitted to the middleware smart contract after a delay.

A second aspect relates to a method in an electronic device comprising a processor, the method comprising transmitting first data associated with a first blockchain to a second application; receiving second data associated with a second blockchain from the second application; transmitting the first data to a middleware smart contract; performing a first blockchain function using the first data and the second data to obtain a first result; receiving third data from the middleware smart contract in response to transmission of the first data to the middleware smart contract; trusting the middleware smart contract when the first result and third data match; and generating an alert when the first result and the third data do not match.

The method provides techniques for performing a handshake transaction between two applications and a separate transaction with the middleware smart contract, a trust is achieved with the middleware smart contract.

In a first implementation form of the method according to the second aspect as such, the first blockchain is associated with a first owner and a first application.

In a second implementation form of the method according to the second aspect as such, the second blockchain is associated with a second owner and the second application.

In a third implementation form of the method according to the second aspect as such, the middleware smart contract is associated with a third blockchain, wherein the third blockchain is a consortium blockchain associated with the first owner and the second owner.

In a fourth implementation form of the method according to the second aspect as such, subsequent to trusting the middleware smart contract, the method further comprises transmitting fourth data associated with the first blockchain; receiving fifth data associated with the second blockchain; performing the first blockchain function using the fourth data and the fifth data to obtain a second result; transmitting, after a delay, the fourth data to the middleware smart contract; receiving sixth data from the middleware smart contract in response to transmission of the fourth data to the middleware smart contract; trusting the middleware smart contract when the second result and sixth data match; and generating an alert when the second result and the third data do not match.

In a fifth implementation form of the method according to the second aspect as such, subsequent to trusting the middleware smart contract, the method further comprises transmitting, via a first communication medium, fourth data associated with the first blockchain; receiving, via the first communication medium, fifth data associated with the second blockchain; performing the first blockchain function using the fourth data and the fifth data to obtain a second result; transmitting, via a second communication medium, the fourth data to the middleware smart contract; receiving, via the second communication medium, sixth data from the middleware smart contract in response to transmission of the fourth data to the middleware smart contract; trusting the middleware smart contract when the second result and sixth data match; and generating an alert when the second result and the third data do not match.

In a sixth implementation form of the method according to the second aspect as such, subsequent to trusting the middleware smart contract, the method further comprises transmit fourth data associated with the first blockchain to the second application; receive fifth data associated with the second blockchain from the second application; transmit the fourth data to the middleware smart contract; perform the first blockchain function using the fourth data and the fifth data to obtain a second result; receive sixth data from the middleware smart contract in response to transmission of the first data to the middleware smart contract; trust the middleware smart contract when the second result and third data match; and generate an alert when the second result and the sixth data do not match.

In a seventh implementation form of the method according to the second aspect as such, subsequent to trusting the middleware smart contract, the method further comprises: performing a second blockchain function using the first result and the second result to obtain a third result; receiving seventh data from the middleware smart contract; trusting the middleware smart contract when the third result and the seventh data match; and generating an alert when the third result and the seventh data do not match.

In an eighth implementation form of the method according to the second aspect as such, when the middleware smart contract is trusted, the method further comprises transmitting real-world data to the middleware smart contract; and receiving a real-world result from the middleware smart contract.

In a ninth implementation form of the method according to the second aspect as such, the first data is transmitted to the second application using a first transmission medium, and wherein the first data is transmitted to the middleware smart contract using a second transmission medium.

In a tenth implementation form of the method according to the second aspect as such, the first data is transmitted to the middleware smart contract after a delay.

A third aspect relates to a computer program product comprising instructions embodied on a computer readable medium which, when executed by an electronic device comprising a processor, cause the electronic device to transmit first data associated with a first blockchain to a second application; receive second data associated with a second blockchain from the second application; transmit the first data to a middleware smart contract; perform a first function using the first data and the second data to obtain a first result; receive third data from the middleware smart contract in response to transmission of the first data to the middleware smart contract; trust the middleware smart contract when the first result and third data match; and generate an alert when the first result and the third data do not match.

The non-transitory computer readable medium includes computer instructions for performing a handshake transaction between two applications and a separate transaction with the middleware smart contract, a trust is achieved with the middleware smart contract.

In a first implementation form of the non-transitory computer readable medium according to the third aspect as such, the first blockchain is associated with a first owner and a first application.

In a second implementation form of the non-transitory computer readable medium according to the third aspect as such, the second blockchain is associated with a second owner and the second application.

In a third implementation form of the non-transitory computer readable medium according to the third aspect as such, the middleware smart contract is associated with a third blockchain, wherein the third blockchain is a consortium blockchain associated with the first owner and the second owner.

In a fourth implementation form of the non-transitory computer readable medium according to the third aspect as such, subsequent to trusting the middleware smart contract, the instructions further cause the electronic device to transmit fourth data associated with the first blockchain; receive fifth data associated with the second blockchain; perform the first blockchain function using the fourth data and the fifth data to obtain a second result; transmit, after a delay, the fourth data to the middleware smart contract; receive sixth data from the middleware smart contract in response to transmission of the fourth data to the middleware smart contract; trust the middleware smart contract when the second result and sixth data match; and generate an alert when the second result and the third data do not match.

In a fifth implementation form of the non-transitory computer readable medium according to the third aspect as such, subsequent to trusting the middleware smart contract, the instructions further cause the electronic device to transmit, via a first communication medium, fourth data associated with the first blockchain; receive, via the first communication medium, fifth data associated with the second blockchain; perform the first blockchain function using the fourth data and the fifth data to obtain a second result; transmit, via a second communication medium, the fourth data to the middleware smart contract; receive, via the second communication medium, sixth data from the middleware smart contract in response to transmission of the fourth data to the middleware smart contract; trust the middleware smart contract when the second result and sixth data match; and generate an alert when the second result and the third data do not match.

In a sixth implementation form of the non-transitory computer readable medium according to the third aspect as such, subsequent to trusting the middleware smart contract, the instructions further cause the electronic device to transmit fourth data associated with the first blockchain to the second application; receive fifth data associated with the second blockchain from the second application; transmit the fourth data to the middleware smart contract; perform the first blockchain function using the fourth data and the fifth data to obtain a second result; receive sixth data from the middleware smart contract in response to transmission of the first data to the middleware smart contract; trust the middleware smart contract when the second result and third data match; and generate an alert when the second result and the sixth data do not match.

In a seventh implementation form of the non-transitory computer readable medium according to the third aspect as such, subsequent to trusting the middleware smart contract, the instructions further cause the electronic device to perform a second blockchain function using the first result and the second result to obtain a third result; receive seventh data from the middleware smart contract; trust the middleware smart contract when the third result and the seventh data match; and generate an alert when the third result and the seventh data do not match.

In an eighth implementation form of the non-transitory computer readable medium according to the third aspect as such, when the middleware smart contract is trusted, the instructions further cause the electronic device to transmit real-world data to the middleware smart contract; and receive a real-world result from the middleware smart contract.

In a ninth implementation form of the non-transitory computer readable medium according to the third aspect as such, the first data is transmitted to the second application using a first transmission medium, and wherein the first data is transmitted to the middleware smart contract using a second transmission medium.

In a tenth implementation form of the non-transitory computer readable medium according to the third aspect as such, the first data is transmitted to the middleware smart contract after a delay.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Blockchains are finding usage in many applications, for example, supply chain management, energy distribution, trade, finance, healthcare tracking, aviation, etc. A single blockchain may be unable to provide all the needs for transactions between entities. In some approaches, a mashup application may be used for cross-chain transactions. A mashup application combines an organization's own resources with other external web services. By using a mashup application, the organization may only have to deal with a single application programming interface (API) to perform cross-chain transactions with other entities. The single API introduces risk to the users inside and outside of the organization, for example fraud or other tampering may occur. Additionally, a single API introduces a monopoly on the cross-chain transactions and external users may be forced to use the organization's API. As an alternative to a mashup application, a middleware using a smart contract may provide a service for cross-chain transactions. There is a need for a mutually trusted middleware smart contract to enable cross-chain interoperability. Described herein is a cloud based smart contract solution for cross-chain transactions. The proposed architecture provides a middleware smart contract remote from the participating blockchains. Using the proposed architecture, the blockchains may engage in cross-chain transactions in a verifiable trusted environment. The smart contract provides third party users using different blockchains a verifiable means of cross-chain transactions.

Figure 1:
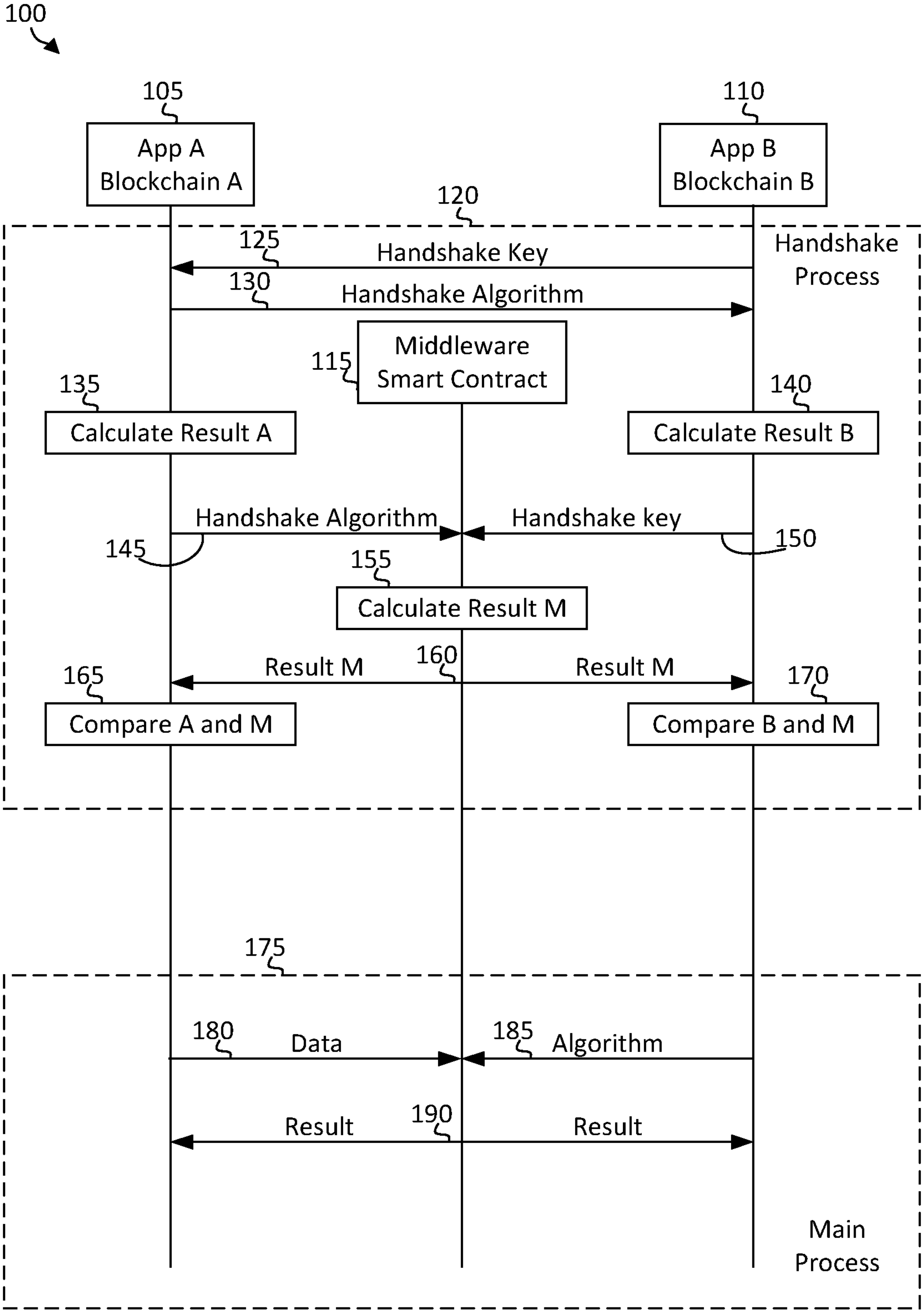
FIG. 1 is a diagram of an embodiment of a system for cross-chain transactions.

FIG. 1 is a diagram of an embodiment of a system 100 for cross-chain transactions. The system 100 includes application A 105 utilizing blockchain A, application B 110 utilizing blockchain B, and middleware smart contract 115. Middleware smart contract 115 may be a middleware configured to execute a smart contract. Application A 105, application B 110, and middleware smart contract 115 may each operate on one or more electronic devices. Application A 105, application B 110, and middleware smart contract 115 may be cloud based software or hardware or a combination of both. Blockchain A and blockchain B may be controlled by different entities. For example, application A 105 may be an app on a phone manufactured by company A and application B may be an app on a refrigerator manufactured by company B. Blockchain A may record data and transactions related to company A. Blockchain B may record data and transactions related to company B. The phone may interact with the refrigerator and thus there may be a need for a transaction between blockchains of different companies. More generally, application A 105 and application B 110 may operate on the same device or different devices, and the middleware smart contract 115 may operate on the same device as one or both of applications A and B, or on a different device.

In an embodiment, the middleware may be associated with a consortium blockchain managed by company A and company B. The middleware smart contract 115 may execute based on the consortium blockchain and/or data received from application A and application B. Company A and company B may collaborate to develop rules for the consortium blockchain. The rules may include formatting of the consortium blockchain, functions of the smart contract, etc. The middleware smart contract 115 may include a middleware software written by company A, company B, or some other third party. The middleware software may facilitate crosschain transactions between blockchain A and blockchain B.

Application A 105 and application B 110 may perform a cross-chain transaction. The cross-chain transaction may be facilitated by middleware smart contract 115. Prior to performing the transaction, application A 105, application B 110, and middleware smart contract 115 perform handshake process 120. At step 125, application B 110 transmits a handshake key to application A. At step 130, application A 105 transmits a handshake algorithm to application B 110. Step 130 may occur before or after step 125. Transmitting between applications may include sending data to a different physical device, sending data to a virtual device on the same or a different physical device, or sending data between applications on the same device.

At operation 135, application A 105 calculates result A based on the handshake key and handshake algorithm. The handshake key may be a piece of data retrieved from or based on blockchain A and the result A may be a result of seeding the handshake algorithm with the data. At operation 140, application B 110 calculates result B based on the handshake key and handshake algorithm. The handshake key may be a piece of data retrieved from or based on blockchain A and the result B may be a result of seeding the handshake algorithm with the data. The handshake algorithm may be retrieved from or based on blockchain B. While the above describes exchanging a handshake key and a handshake algorithm, in some embodiments, handshake keys may be exchanged by both application A 105 and application B 110, and the handshake algorithm can be a commonly-known function of two keys, or the handshake algorithm can be determined based on one of the two keys.

At step 145, application A 105 transmits the handshake algorithm from step 130 to the middleware smart contract 115. At step 150, application B 110 transmits the handshake key from step 125 to the middleware smart contract 115. Step 145 may occur before or after step 150. In an alternative embodiment, at step 145, application A 105 may transmit the handshake key received at step 125 to the middleware smart contract 115 and application B may transmit the handshake algorithm received at step 130 to the middleware smart contract 115. At operation 155, the middleware smart contract 115 calculates a result M using the handshake key and the handshake algorithm using a blockchain function. The handshake key may be a piece of data and the result M may be a result of seeding the handshake algorithm with the data. At step 160, the middleware smart contract 115 transmits the result M to application A 105 and application B 110. The middleware smart contract 115 may transmit result M in a single message or individual messages to each of application A 105 and application B 110.

At operation 165, application A 105 compares result A and result M. If the results match, then application A 105 may trust the middleware smart contract 115. At operation 170, application B 110 compares result B and result M. If the results match, then application B 110 may trust the middleware smart contract 115. If the results do not match for either application A 105 or application B 110, the one of application A 105 or application B 110 reports that the middleware smart contract 115 has failed validation. The report may be transmitted to an owner of the middleware smart contract 115 and/or other interested parties in the trustworthiness of the middleware smart contract 115. Application A 105 and application B 110 can also prevent processing of further transactions with the middleware smart contract 115 until trustworthiness is reestablished (for example, with one or more successful handshakes, or an external command).

If the middleware smart contract 115 is trusted, then main process 175 may begin or continue if the main process 175 was already running. Main process 175 is the process of executing real-world transactions between application A 105 and application B 110, while handshake process 120 is the process of verifying trustworthiness of the middleware smart contract 115. The handshake process 120 is executed concurrently with a running main process 175. The handshake process 120 may be executed in an efficient manner in order to minimize the impact on the main process 175, for example using small amounts of data as the handshake key and simple algorithms as the handshake algorithm. Further, the handshake process 120 is executed in a manner to be indistinguishable from transactions in the main process 175 by using handshake data that is similar to real-world data used by the main process 175 and handshake algorithms that are similar or the same as real-world algorithms used in the main process 175.

As part of main process 175, application A 105 may transmit real-world data to the middleware smart contract 115 at step 180 in a manner similar to the handshake process 120. Application B 110 may transmit a real-world algorithm to the middleware smart contract 115 at step 185 in a manner similar to the handshake process 120. Step 180 may occur before or after step 185. Middleware smart contract 115 may perform an operation, for example a blockchain function, using the real-world data from step 180 and the real-world algorithm from step 185. The operation may be a transaction between application A 105 and application B 110. The transaction between application A 105 and application B 110 may be a financial transaction, e.g., between two types of crypto currency blockchains; a data transaction, e.g., a mobile device requesting data from a streaming platform; a control transaction, e.g., a mobile device controlling an appliance; or any other transaction between blockchains.

At step 190, the middleware smart contract 115 may transmit the result of the operation to application A 105 and application B 110. The middleware smart contract 115 may transmit the result of the operation in a single message or individual messages to each of application A and application B. The middleware smart contract 115 may also update a consortium blockchain mutually controlled by both application A 105 and application B 110. Application A 105 may update blockchain A based on the result received from the middleware smart contract 115. Application B 110 may update blockchain B based on the result received from the middleware smart contract 115. The handshake process 120 may be performed periodically while the main process 175 is running in order to verify the middleware smart contract 115 remains trustworthy. Periodically performing the handshake using data similar to the real world transactions performed by the middleware smart contract 115 helps to mask handshake transactions from real world transactions, adding an additional layer of security to the handshake process 120.

Figure 2:
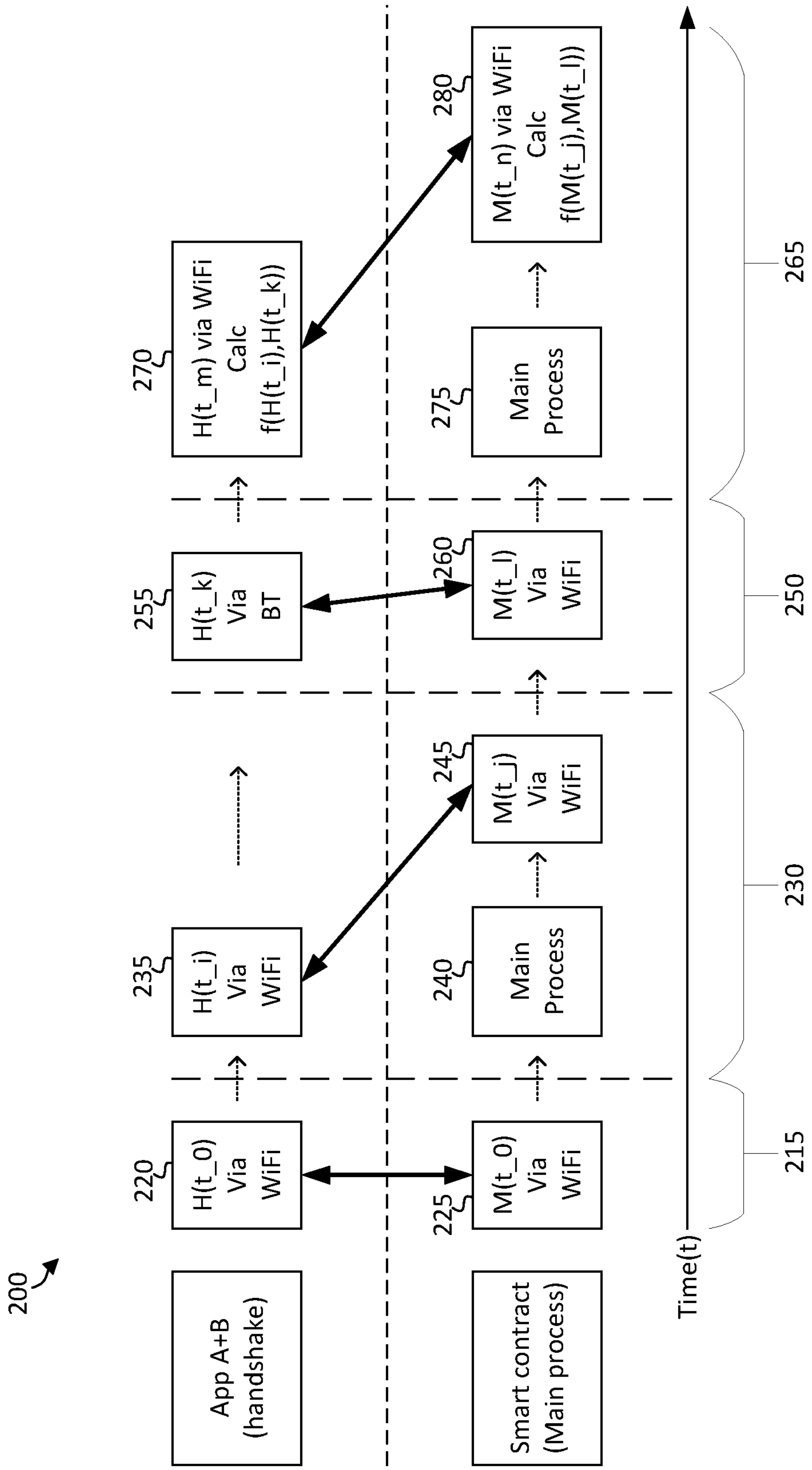
FIG. 2 is a diagram of an embodiment of handshake processing versus time.

FIG. 2 is a diagram 200 of an embodiment of handshake processing versus time. An application A and an application B perform handshake processing similar to handshake process 120. A middleware smart contract performs main processing similar to main process 175. During various time intervals the type of processing of the handshake may vary to further mask the handshake process from the main process. During interval 215, concurrent processing of the handshake may occur. Concurrent processing may include transmitting the handshake key and handshake algorithm via Wi-Fi (for example) between application A and application B and the middleware smart contract. The transmissions may all occur at or about time t_0. Application A and application B may each use a function 220 H(t_0) to calculate a result for comparison. The middleware smart contract may use a function 225 M(t_0) to calculate a result for comparison, and send the result to applications A and application B. Application A and application B may then compare the result of function 225 with the result of their corresponding function 220 in order to determine trust of the middleware handshake process.

As the main processing continues, sequential handshake processing may be performed during interval 230. Sequential handshake processing may include transmitting the handshake key and handshake algorithm via Wi-Fi between application A and application B and the middleware smart contract. Each transmission may occur at a different time. For example, application A and application B may exchange the handshake key and handshake algorithm at time t_i. At time t_j, application A and application B may transmit the handshake key and handshake algorithm to the middleware smart contract. Application A and application B may each use function 235 H(t_i) to calculate a result for comparison while the middleware smart contract is performing the main processing 240. At a later time, the middleware smart contract may use a function 245 M(t_j) to calculate a result. Application A and application B may then compare the result of function 245 with the result of their corresponding function 235 in order to determine trust of the middleware handshake process.

Out of band handshake processing may be performed during interval 250. Out of band processing includes using different communication formats for transmitting data between application A and application B and the middleware smart contract. For example, application A and application B may exchange the handshake key and handshake algorithm using Bluetooth, while application A and application B may transmit the handshake key and handshake algorithm to the middleware smart contract using Wi-Fi. Out of band processing not only verifies trustworthiness of the middleware smart contract, but also verifies trustworthiness of the communication medium. For example, if the Wi-Fi signal was tampered with, using Bluetooth would help to identify the tampering. Application A and application B may each use function 255 H(t_k) to calculate a result for comparison. The middleware smart contract may use function 260 M(t_l) to calculate a result. Application A and application B may then compare the result of function 260 with the result of their corresponding function 255 in order to determine trust of the middleware handshake process and communication medium.

Extra algorithmic handshake processing may be performed during interval 265. Extra algorithmic handshake processing includes combining several algorithms to arrive at a result for comparison. Extra algorithmic handshake processing may include transmitting the handshake key and handshake algorithm via Wi-Fi between application A and application B and the middleware smart contract. Each transmission may occur at a different time. Application A and application B may transmit function 270 H(t_m), but calculate a function based on previous handshakes, e.g. f(H(t_i),H(t_k)). The main process continues at function 275. At a future time, the smart contract receives function 280 M(t_n), but calculates a function based on previous handshakes, e.g. f(M(t_j),M(t_l)). Application A and application B may then compare the result of function f(M(t_j), M(t_l)) with the result of their corresponding function f(H(t_i),H(t_k)) in order to determine trust of the middleware handshake process.

The various types of processing may be performed in different orders than the order presented in FIG. 2. For example, out of band processing may occur prior to sequential processing. Performing the various types of handshake processing while the main process is executing hides the handshake function within the smart contract main processing. Handshake processing occurs at random intervals or at periodic intervals. The ratio of handshake transactions to main process transactions may vary. In some cases, the ratio may be that 1% or less of transactions are handshake, in other cases, as many as 10% of transactions may be handshake transactions. The ratio may be based on various factors, e.g., processing capacity of the systems where the applications and middleware operate, desired security of the transactions, etc. Handshake processing is blended into the main processing. In this manner, the handshake is indistinguishable to the smart contract and associated middleware.

Figure 3:
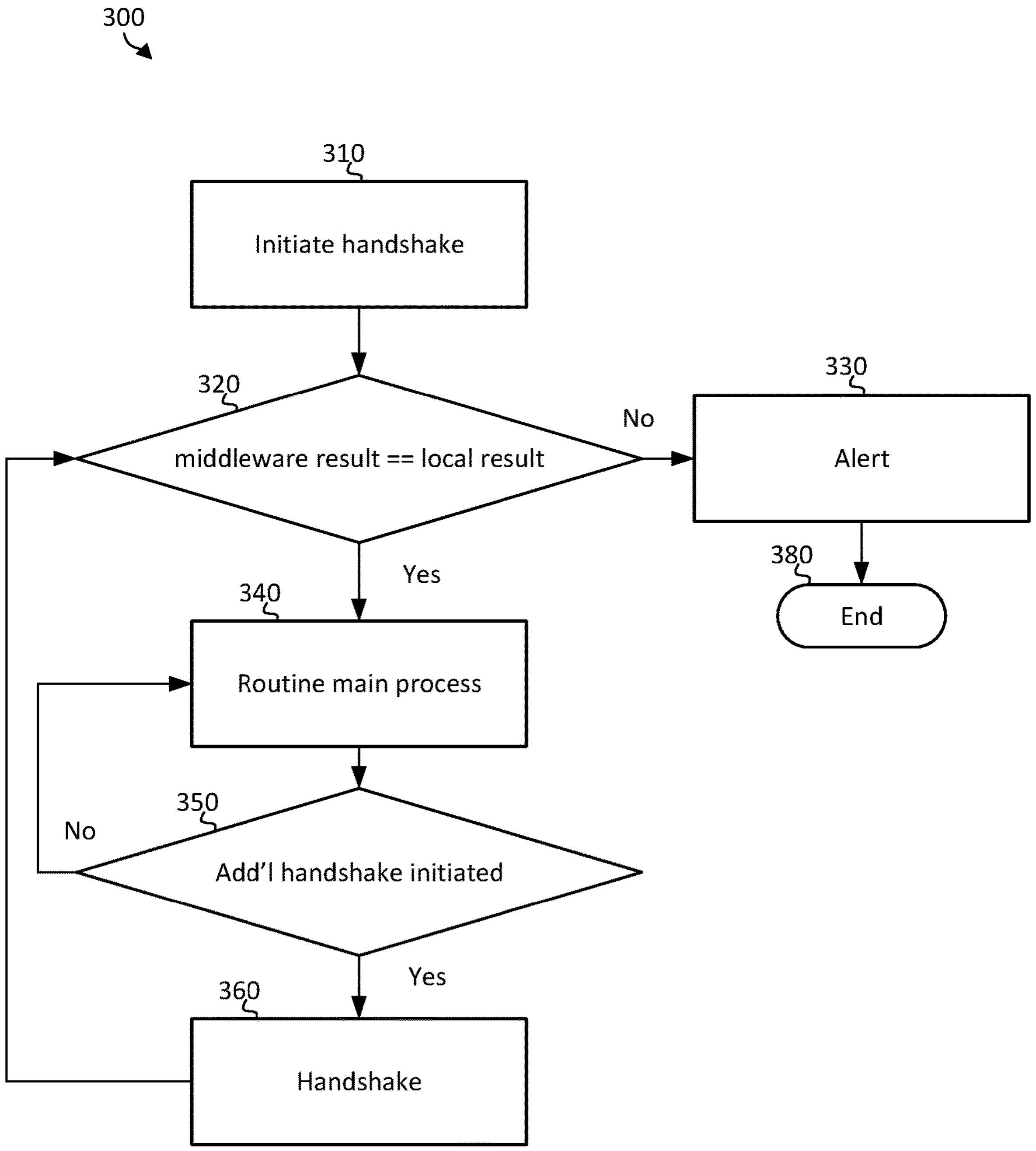
FIG. 3 is a flow diagram of an embodiment of a handshake verification process.

FIG. 3 is a flow diagram of an embodiment of a handshake verification process 300. The process 300 begins with block 310 by initiating the handshake process. The handshake process of block 310 may be similar to handshake process

120. Results of the handshake process may be compared at block 320. If the middleware result does not match the local result at the applications, the process 300 continues at block 330 where an alert is generated indicating the failure of the handshake. The process 300 then ends at block 380. If the middleware result matches the local result at the applications, the process 300 continues at block 340 where the main process continues execution. The process 300 loops from block 350 to block 340 until an additional handshake is initiated. The additional handshake is periodically or sporadically executed at block 360 and the process 300 returns to block 320 where the additional handshake is performed. The process 300 illustrates the concurrent nature of the handshake process and the main process. The computation of the handshake is sporadically mixed into the main processing so that the handshake is indistinguishable from the main process. Hiding the handshake process in the main process reduces the possibility of the handshake process being duplicated maliciously.

Figure 4:
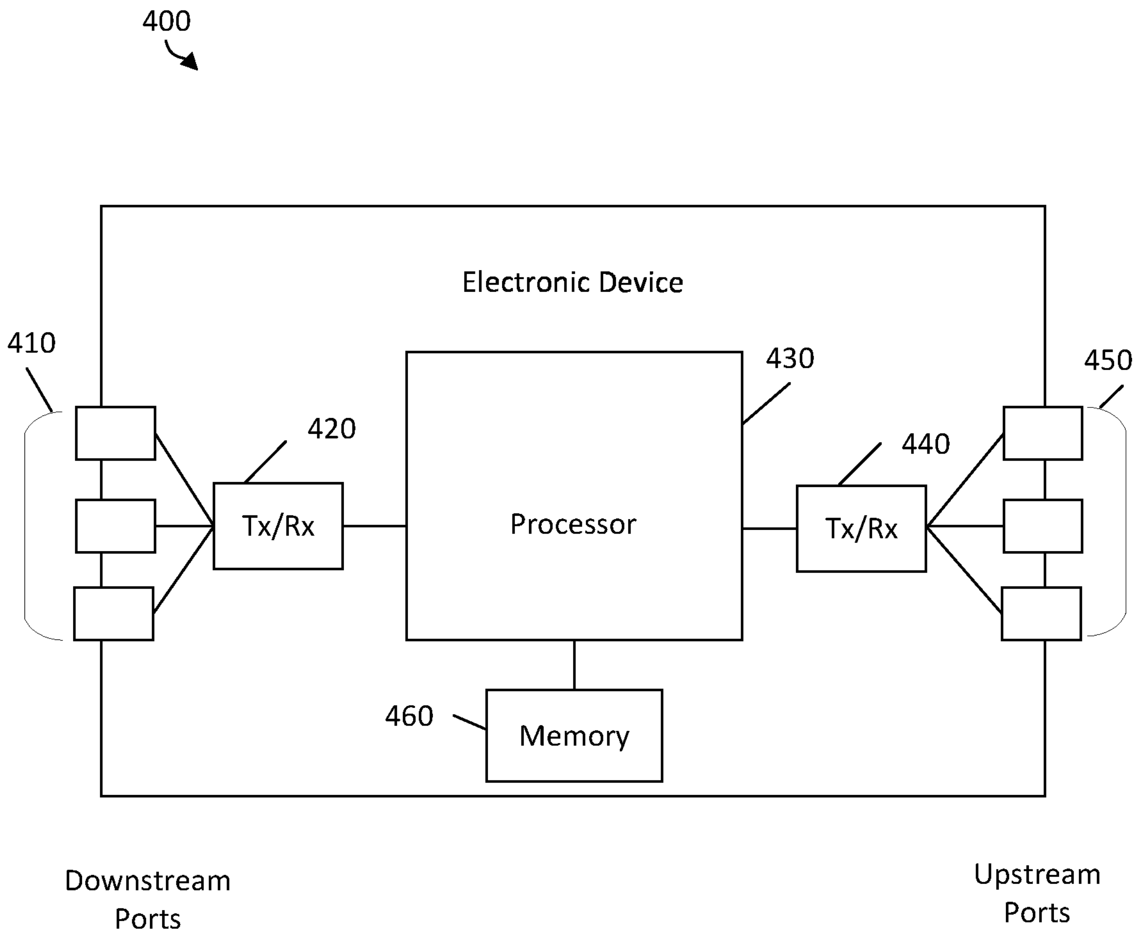
FIG. 4 is a schematic diagram of an electronic device according to an embodiment of the disclosure.

FIG. 4 is a schematic diagram of an electronic device 400 according to an embodiment of the disclosure. The electronic device 400 is suitable for implementing the disclosed embodiments as described herein. The electronic device 400 comprises ingress ports 410 and receiver units (Rx) 420 for receiving data; a processor, logic unit, or central processing unit (CPU) 430 to process the data; transmitter units (Tx) 440 and egress ports 450 for transmitting the data; and a memory 460 for storing the data. The electronic device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), field-programmable gate arrays (FPGAs), application specific integrated circuits (ASICs), and digital signal processors (DSPs). The processor 430 is in communication with the ingress ports 410, receiver units 420, transmitter units 440, egress ports 450, and memory 460. The memory 460 comprises one or more disks, tape drives, and solid-state drives and may be used as an over-flow data storage device, to store programs when such programs are selected for execution, and to store instructions and data that are read during program execution. The memory 460 may be volatile and/or non-volatile and may be read-only memory (ROM), random-access memory (RAM), ternary content-addressable memory (TCAM), and/or static random-access memory (SRAM).

Figure 5:
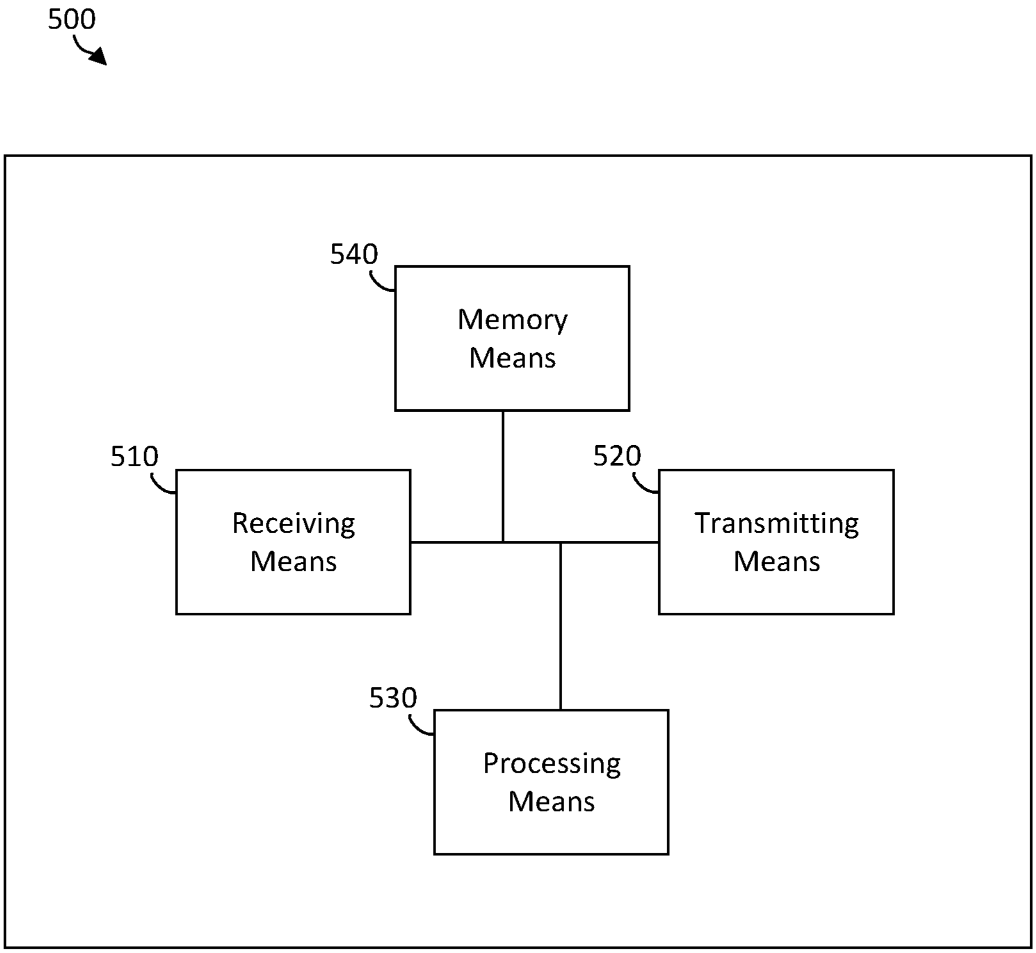
FIG. 5 is a diagram of a means for implementing a verifiable smart contract.

FIG. 5 is a diagram of a means 500 for implementing a verifiable smart contract, for example an electronic device hosting an application interacting with a blockchain, or an electronic device hosting a middleware smart contract. The means for implementing a verifiable smart contract 500 includes memory means 520, for example memory 460; and processing means 510, for example processor 430.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An electronic device comprising:

a memory; and one or more processors coupled to the memory and configured to receive instructions from the memory which, when executed by the one or more processors, cause the electronic device to:

transmit first data associated with a first blockchain to a second application, wherein the first data is a handshake algorithm;

receive second data associated with a second blockchain from the second application, wherein the second data is a handshake key;

transmit the first data to a middleware smart contract, wherein the middleware smart contract is associated with a third blockchain;

calculate a first result based on a first blockchain function using the first data and the second data;

receive third data from the middleware smart contract in response to transmission of the first data to the middleware smart contract;

compare the first result with the third data;

trust the middleware smart contract when the first result and third data match; and generate an alert when the first result and the third data do not match, wherein generating the alert comprises preventing processing of further transactions with the middleware smart contract until trustworthiness is reestablished by one or more successful handshakes, and wherein the one or more successful handshakes are executed periodically or sporadically concurrently with execution of one or more main cross-chain transaction processes such that one or more handshakes are mixed into the one or more main cross-chain transaction processes to be indistinguishable from real-world transactions.

2. The electronic device of claim 1, wherein the first blockchain is associated with a first owner and a first application.

3. The electronic device of claim 2, wherein the second blockchain is associated with a second owner and the second application.

4. The electronic device of claim 3, wherein the third blockchain is a consortium blockchain associated with the first owner and the second owner.

5. The electronic device of claim 1, wherein, subsequent to trusting the middleware smart contract, the instructions further cause the electronic device to:

transmit fourth data associated with the first blockchain, wherein the fourth data is a handshake algorithm;

receive fifth data associated with the second blockchain, wherein the fifth data is a handshake key;

calculate a second result based on the first blockchain function using the fourth data and the fifth data;

transmit, after a delay, the fourth data to the middleware smart contract;

receive sixth data from the middleware smart contract in response to transmission of the fourth data to the middleware smart contract;

compare the second result with the sixth data;

trust the middleware smart contract when the second result and sixth data match; and generate an alert when the second result and the third data do not match.

6. The electronic device of claim 1, wherein, subsequent to trusting the middleware smart contract, the instructions further cause the electronic device to:

transmit, via a first communication medium, fourth data associated with the first blockchain to the second application, wherein the fourth data is a handshake algorithm;

receive, via the first communication medium, fifth data associated with the second blockchain from the second application, wherein the fifth data is a handshake key;

calculate a second result based on the first blockchain function using the fourth data and the fifth data;

transmit, via a second communication medium, the fourth data to the middleware smart contract;

receive, via the second communication medium, sixth data from the middleware smart contract in response to the fourth data;

compare the second result with the sixth data;

trust the middleware smart contract when the second result and sixth data match; and generate an alert when the second result and the third data do not match.

7. The electronic device of claim 1, wherein, subsequent to trusting the middleware smart contract, the instructions further cause the electronic device to:

transmit fourth data associated with the first blockchain to the second application, wherein the fourth data is a handshake algorithm;

receive fifth data associated with the second blockchain from the second application, wherein the fifth data is a handshake key;

transmit the fourth data to the middleware smart contract;

calculate a second result based on the first blockchain function using the fourth data and the fifth data;

receive sixth data from the middleware smart contract in response to transmission of the first fourth data to the middleware smart contract;

compare the second result with the sixth data;

trust the middleware smart contract when the second result and sixth data match; and generate an alert when the second result and the sixth data do not match.

8. The electronic device of claim 7, wherein, subsequent to trusting the middleware smart contract, the instructions further cause the electronic device to:

calculate a third result based on a second blockchain function using the first result and the second result;

receive seventh data from the middleware smart contract;

compare the third result with the seventh data;

trust the middleware smart contract when the third result and the seventh data match; and generate an alert when the third result and the seventh data do not match.

9. The electronic device of claim 8, wherein when the middleware smart contract is trusted, the instructions further cause the electronic device to:

transmit real-world data to the middleware smart contract; and receive a real-world result from the middleware smart contract.

10. The electronic device of claim 1, wherein the first data is transmitted to the second application using a first transmission medium, and wherein the first data is transmitted to the middleware smart contract using a second transmission medium.

11. The electronic device of claim 1, wherein the first data is transmitted to the middleware smart contract after a delay.

12. A method for performing handshake transaction by an electronic device comprising a processor in a cross-chain environment, the method comprising:

transmitting first data associated with a first blockchain to a second application, wherein the first data is a handshake algorithm;

receiving second data associated with a second blockchain from the second application, wherein the second data is a handshake key;

transmitting the first data to a middleware smart contract, wherein the middleware smart contract is associated with a third blockchain;

calculating a first result based on a first blockchain function using the first data and the second data;

receiving third data from the middleware smart contract in response to transmission of the first data to the middleware smart contract;

comparing the first result with the third data;

based on that the first result matches with the third data, trusting the middleware smart contract, wherein the one or more successful handshakes are executed periodically concurrently with execution of one or more main cross-chain transaction processes such that one or more handshakes are mixed into the one or more main cross-chain transaction processes to be indistinguishable from real-world transactions.

13. The method of claim 12, wherein the first blockchain is associated with a first owner and a first application.

14. The method of claim 13, wherein the second blockchain is associated with a second owner and the second application.

15. The method of claim 14, wherein the third blockchain is a consortium blockchain associated with the first owner and the second owner.

16. The method of claim 12, wherein, subsequent to trusting the middleware smart contract, the method further comprises:

transmitting fourth data associated with the first blockchain, wherein the fourth data is a handshake algorithm;

receiving fifth data associated with the second blockchain, wherein the fifth data is a handshake key;

calculating a second result based on the first blockchain function using the fourth data and the fifth data;

transmitting, after a delay, the fourth data to the middleware smart contract;

receiving sixth data from the middleware smart contract in response to transmission of the fourth data to the middleware smart contract;

comparing the second result with the sixth data;

based on that the second result matches with the sixth data, trusting the middleware smart contract.

17. The method of claim 12, wherein, subsequent to trusting the middleware smart contract, the method further comprises:

transmitting, via a first communication medium, fourth data associated with the first blockchain to the second application, wherein the fourth data is a handshake algorithm;

receiving, via the first communication medium, fifth data associated with the second blockchain from the second application, wherein the fifth data is a handshake key;

calculating a second result based on the first blockchain function using the fourth data and the fifth data;

transmitting, via a second communication medium, the fourth data to the middleware smart contract;

receiving, via the second communication medium, sixth data from the middleware smart contract in response to transmission of the fourth data to the middleware smart contract;

comparing the second result with the sixth data;

based on that the second result matches with the sixth data, trusting the middleware smart contract.

18. The method of claim 12, wherein, subsequent to trusting the middleware smart contract, the method further comprises:

transmitting fourth data associated with the first blockchain to the second application, wherein the fourth data is a handshake algorithm;

receiving fifth data associated with the second blockchain from the second application, wherein the fifth data is a handshake key;

transmitting the fourth data to the middleware smart contract;

calculating a second result based on the first blockchain function using the fourth data and the fifth data;

receiving sixth data from the middleware smart contract in response to transmission of the fourth data to the middleware smart contract;

comparing the second result with the sixth data;

based on that the second result matches with the sixth data, trusting the middleware smart contract.

19. The method of claim 18, wherein, subsequent to trusting the middleware smart contract, the method further comprises:

calculating a third result based on a second blockchain function using the first result and the second result;

receiving seventh data from the middleware smart contract;

comparing the third result with the seventh data;

based on that the third result matches with the seventh data, trusting the middleware smart contract.

20. The method of claim 19, wherein when the middleware smart contract is trusted, the method further comprises:

transmitting real-world data to the middleware smart contract; and receiving a real-world result from the middleware smart contract.

21. The method of claim 12, wherein the first data is transmitted to the second application using a first transmission medium, and wherein the first data is transmitted to the middleware smart contract using a second transmission medium.

* * * * *